March 31, 1970      E. BARNES      3,503,538
METERING PROCESS AND APPARATUS
Filed Nov. 9, 1967
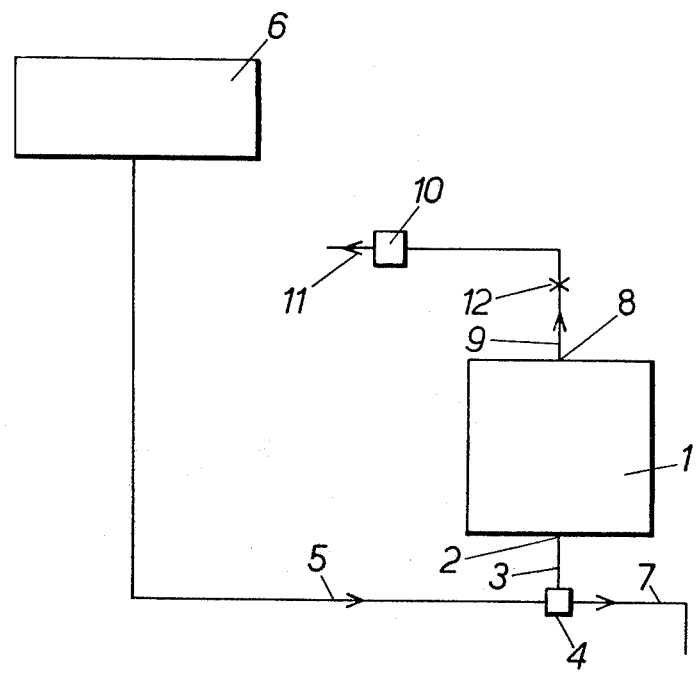
INVENTOR
EDWARD BARNES
By Jacobs & Jacobs 3,503,538
METERING PROCESS AND APPARATUS
Edward Barnes, Speldhurst, England, assignor to BP Chemicals (U.K.) Limited, London, England, a British company
Filed Nov. 9, 1967, Ser. No. 681,710
Claims priority, application Great Britain, Nov. 29, 1966, 53,290/66
Int. Cl. G01f 11/28
U.S. Cl. 222—1
3 Claims

ABSTRACT OF THE DISCLOSURE

A process and apparatus for dispensing measured quantities of a fluid which is stored under sufficient pressure for it to be liquid at ambient temperature, e.g. anhydrous liquid ammonia, comprises admitting the liquid under pressure to a chamber free from contaminating fluids, connecting the chamber to a dispense point at a lower pressure whereupon some of the liquid evaporates and forcibly dispenses the contents of the chamber therefrom, and admitting into the chamber further liquid under pressure in readiness for the next dispensing cycle. The invention is particularly useful in the dispensing of bulk liquid ammonia to the land.

---

The present invention relates to a process and apparatus for dispensing measured quantities of fluid, particularly fluid which is stored as a liquid under pressure and dispensed at a lower pressure.

Apparatus, used to inject fluids such as ammonia into soil, is already known in which ammonia leaves a reservoir and is passed through a pump, which controls the amount dispensed, before being injected into the soil. The ammonia enters the pump as a liquid under considerable pressure but is released from the pump and injected into the ground as a gas at a much lower pressure.

According to the present invention the process for dispensing measured quantities of a fluid which is stored under sufficient pressure for it to be liquid at ambient temperature comprises admitting the liquid under pressure to a chamber free from contaminating fluids, connecting the chamber to a dispense point at a lower pressure whereupon some of the liquid evaporates and forcibly dispenses the contents of the chamber therefrom, and admitting into the chamber further liquid under pressure in readiness for the next dispensing cycle.

In the process of the present invention the fluid admitted to the chamber and the fluid dispensed therefrom is preferably controlled by a two-way valve which may be connected to a port in the base of the chamber, to a storage vessel containing the fluid to be dispensed, and to a dispense point. Thus, when the valve is in one position the chamber will be in communication with the storage vessel and when the valve is in the second position the chamber will be in communication with the dispense point.

The process of the present invention is particularly useful in supplying liquid ammonia in fixed doses to the soil for fertilisation purposes. Under these circumstances it is desirable to have the dispensing cycle regularly controlled so that as a tractor or other means moves across the soil a fixed quantity of fluid is repeatedly injected into the soil at regular intervals. This may be achieved by attaching a power source to the two-way valve such that each position of the valve is realised at fixed intervals of time permitting regular filling of fluid and dispensing of fluid from the chamber. In the case of a tractor the power source may be obtained from a land wheel so that ammonia is dispensed to the land at fixed distances apart in fixed doses.

The process of the present invention requires the chamber to be free from contaminating fluids e.g. air, and according to a modification of the process the chamber is rendered free from contaminants by purging the chamber with a portion of the fluid to be dispensed. Such a purging operation may be achieved by providing in the top of the chamber a vent line together with a simple on/off cock arrangement. Or preferably the vent line may also be provided with a float-operated valve whose float cuts off the vent line as the liquid reaches a certain level; at that stage the cock is then closed so that the valve plays no further part in subsequent dispensing cycles.

The liquid to be dispensed is preferably stored at a sufficient height above the chamber so that the hydrostatic pressure is capable of liquefying any gas which evaporates in the chamber. Where the liquid is not stored at a sufficient height above the chamber or is actually below the chamber, the first few dispensing cycles will not give a fixed measure of liquid because of the presence of gas above the liquid in the chamber. However, after say 5-10 dispensing cycles the cooling produced by successive evaporations is sufficient to liquefy the residual gas in the chamber and thus the process will then dispense fixed quantities of fluid.

If desired, however, the chamber may be lagged or provided with refrigeration means in order to ensure that evaporation in the chamber will be kept to a minimum and the liquefaction of any gas will be rapidly effected.

The quantity of fluid dispensed at each operation may be altered by employing a chamber provided with means for altering its volume. For example the chamber may be of cylindrical shape and comprise two sections in threaded engagement so that the length, and hence the volume of the chamber, can be varied by screwing the sections closer together or further apart. In a further example the chamber is again cylindrical and contains a movable piston. This piston may be connected to a rod which penetrates through an end wall of the chamber and is in threaded engagement therewith. A micrometer type scale may also be provided in association with the rod and piston arrangement to permit accurate adjustment of the piston position.

An apparatus embodying the process of the present invention will now be described with reference to the drawings accompanying the specification.

The drawing shows in diagrammatic form apparatus having a chamber 1 which has a port 2 situated in the base of the chamber the port being connected via a line 3 to a two-way valve 4. This valve is connected via line 5 to a reservoir 6 for liquefied gas, e.g. anhydrous liquid ammonia and via line 7 to a dispensing point (not shown) which may be for example in association with apparatus for injecting ammonia into soil. A second port 8, in the top of the chamber 1 is connected via line 9 to a float chamber 10, which has an outlet for vapor 11. A valve 12 is situated in line 9 between the port 8 and the float chamber 10. The reservoir 6 is shown at a height above the chamber 1.

At the commencement of operations, the chamber 1 may contain some air and to purge the chamber of this contaminant the valve 12 is opened and the two-way valve 4 is set to communicate the reservoir 6 with the chamber 1. Liquefied gas flows into chamber 1 via lines 5 and 3. On first entering the chamber, some of the liquid immediately evaporates, entrains any air or other gas present and sweeps it via port 8 and line 9 to float chamber 10 and out via outlet 11. As more liquid enters chamber 1, liquid will flow via line 9 to float chamber 10, where it will cause the float in the float chamber to rise and close outlet 11. On cessation of vapor flow from the outlet, valve 12 is manually closed.

Chamber 1 is now filled with liquefied gas. The two-way valve 4 is then set to communicate the chamber 1 with the dispense line 7 which is at atmospheric pressure. Some of the fluid in the chamber immediately vaporises and is dispensed under the pressure of its own vapor via the valve 4 and line 7. When substantially all the fluid is dispensed from the chamber the valve 4 is set to connect the chamber 1 with the reservoir 6 to permit the chamber to fill with liquid in readiness for the next dispensing cycle. As the chamber 1 refills with fluid there is a pocket of gas trapped at the top of the chamber which unless liquefied will prevent the chamber dispensing full measure. As the fluid is stored above the level of the chamber there is sufficient hydrostatic pressure available to liquefy this gas thereby allowing the chamber to be filled with liquid. When the liquid is not stored so as to provide this hydrostatic pressure the first few dispensing cycles will not give fixed measures of fluid because of the gas present in the top of the chamber. However, after a few dispensing cycles the cooling produced from successive evaporations is sufficient to liquefy any gas present in the chamber.

If the fluid to be dispensed is not stored above the level of the chamber and the storage pressure is not sufficient to force the liquid into the chamber at an acceptable rate then a pump may have to be installed to feed the fluid to the chamber.

In an alternative embodiment of the process (not shown) the chamber 1 may be provided with a tube passing from the top to the bottom of the chamber and the common exit/entry port 2 may be replaced by a separate entry port and exit port both communicating with the tube. In the tube is located a shaft within which is housed a variant on the two-way valve 4 which is in communication through the interior of the shaft with a fluid supply and a dispense point. The ports in the tube and the two-way valve are arranged such that as the chamber is urged to one position on the shaft the chamber is filled with fluid under pressure and as it is urged to a second position on the shaft fluid is dispensed from the chamber. The movement of the chamber on the shaft should be such that no fluid escapes and this may be achieved by placing "O" rings at appropriate points on the shaft. This alternative embodiment is particularly useful for experimental work with anhydrous liquid ammonia where small accurately measured doses are required. Should repeated doses be required the movement of the chamber on the shaft could be actuated, for example, by a cam arrangement or other actuating means.

I claim:

1. A process for dispensing measured quantities of a fluid, which is stored under sufficient pressure for it to be liquid at ambient temperature, which comprises storing the liquid to be dispensed at a sufficient height above a dispensing chamber to provide sufficient hydrostatic pressure to liquefy any gas which may be present in the chamber, admitting the liquid under pressure to the chamber free of contaminating fluids, connecting the chamber to a dispense point at a lower pressure whereupon some of the liquid evaporates and forcibly dispenses the contents of the chamber therefrom, and admitting into the chamber further liquid under pressure in readiness for the next dispensing cycle.

2. A process according to claim 1 which comprises controlling the admission and dispensing of the fluid to and from the chamber by a two-way valve.

3. A process according to claim 2 which comprises purging the chamber to render it free from contaminants with a portion of the fluid to be dispensed.

References Cited

UNITED STATES PATENTS

| | | | |
|---|---|---|---|
| 1,634,089 | 6/1927 | Slate | 222—394 X |
| 2,156,869 | 5/1939 | Richert | 222—444 X |
| 2,259,863 | 10/1941 | Smith | 222—444 X |
| 2,362,724 | 11/1944 | Shea | 222—40 |
| 2,494,793 | 1/1950 | Boe | 222—394 |
| 2,565,045 | 8/1951 | Ray | 222—444 X |
| 2,761,596 | 9/1956 | Ward | 222—444 |
| 2,943,770 | 7/1960 | Schmid | 222—444 X |

SAMUEL F. COLEMAN, Primary Examiner

U.S. Cl. X.R.

222—444